United States Patent [19]

Stahl et al.

[11] Patent Number: 4,697,800

[45] Date of Patent: Oct. 6, 1987

[54] CLAMPING DEVICE

[75] Inventors: Bernard Stahl, Neunkirchen-Salchendorf; Horst Böhm, Siegen, both of Fed. Rep. of Germany

[73] Assignee: Optima Spanntechnik GmbH

[21] Appl. No.: 900,536

[22] Filed: Aug. 26, 1986

[30] Foreign Application Priority Data

Oct. 19, 1985 [DE] Fed. Rep. of Germany ....... 3537337
Feb. 21, 1986 [DE] Fed. Rep. of Germany ....... 3605620

[51] Int. Cl.[4] .............................................. B23Q 3/08
[52] U.S. Cl. ........................................ 269/32; 269/20
[58] Field of Search ...................... 269/20, 24, 25, 27, 269/32, 91, 93, 309, 310

[56] References Cited

U.S. PATENT DOCUMENTS 2,681,581 6/1954 Pearson ................................ 269/32
2,966,820 1/1961 Huyett .................................. 269/32
3,663,115 5/1972 Vindez et al. ......................... 269/32
4,080,716 3/1978 Vom Dorp ........................... 269/20

*Primary Examiner*—Frederick R. Schmidt
*Assistant Examiner*—Judy J. Hartman
*Attorney, Agent, or Firm*—Toren, McGeady & Associates

[57] ABSTRACT

A clamping device, for use for example for clamping a tool or workpiece in position in a machine tool comprises a clamping anchor to which a clamping force is applied by a hydraulically operated cylinder. The device also includes a screw operated compensating or back-up unit which acts on the piston of the hydraulic cylinder. The compensating unit is driven by the same hydraulic system as the hydraulic cylinder and when the piston has been moved hydraulically to apply the clamping force to the anchor, a screw component of the compensating unit moves into engagement with the piston to lock the piston in position and maintain the clamping force even if the hydraulic pressure on the piston is then released.

20 Claims, 6 Drawing Figures

CLAMPING DEVICE

FIELD OF THE INVENTION

This invention relates to a device for clamping an object in position, for example for clamping a tool or workpiece in position in a machine tool. This device comprises a compensating unit, which is operated by a fluid pressure system, in combination with a clamping head for moving a clamping anchor, the compensating unit comprising components which can be axially separated one from another mechanically.

BACKGROUND OF THE INVENTION

In the operation of machine tools, and in particular presses, clamping devices serve for clamping workpieces and/or tools, for example to the machine table, press ram or plate holder. The clamping devices are conventionally actuated hydromechanically, the actual clamping force being generated for example by a mechanical toggle lever system.

A hydromechanical quick-acting clamping device which is disclosed in German Patent Specification No. 2 233 940 has a fluid pressurised piston, which is slidable transversely to the clamping direction in a housing, and at least one clamping lever, which bears at one end against the piston and at the other end against a pressure plate. The plate projects from the housing in the direction of clamping and is provided with a clamping anchor. The lever is pivotal about its end nearest the piston between at least one inclined position and one extended position in respect of the clamping direction. The pressure plate is fluid-pressure-connected at its piston-side boundary surface with a pressure chamber of the piston which causes clamping and is fluid-sealed with respect to the housing. In this way, high clamping forces and the least possible axial play of the clamping anchor are ensured; that is to say there are relatively large idling strokes within the very rapid clamping and release cycle. A functional division between the initial idling stroke and the succeeding, controlled clamping and locking of the clamping anchor can be achieved.

In order, in the case of clamping devices in which the clamping forces are produced by a hydromechanical toggle lever system, which permits only small clamping strokes when large forces are generated, to be independent of the necessarily tight thickness tolerances that must be observed, a compensating unit may be provided for the infinitely adjustable coverage of clamping movements up to approximately 15 mm. Such units are suitable especially as a supplementary device for hydromechanical clamping devices, and such an arrangement is disclosed in German Gefrauchsmiester Specification No. 8 204 128. This compensating unit comprises, substantially in an undivided housing, two coaxial screw-threaded bolts cooperating with internal threads of nut-like housing components. One of the bolts has a lefthand and the other a righthand thread, and the bolts are adjustable by means of a hydraulic rotary drive, to enable the housing components to be axially separated one from another.

OBJECTS OF THE INVENTION

The main object of the present invention is to provide a clamping device as initially described which, in operation, when in its clamping position, is independent, as far as its clamping force is concerned, of the influences in the use of air and especially oil as the fluid under pressure of variations in, for example, viscosity, temperature, and pressure produced by leakages and expansion of pipes and hoses.

It is a further object to provide such a clamping device which permits large adjustment movements of the components of the compensating unit which can be moved axially apart from one another, to thus increase the clamping range which can be covered by the clamping device.

SUMMARY OF THE INVENTION

According to the invention, in a clamping device as initially described, the clamping head is a clamping cylinder, which is operated exclusively by fluid pressure from the fluid pressure system with which it is coupled, and has a cylinder housing which bears against an external housing part of the compensating unit, the cylinder, when in its clamping position, forcing the anchor against the tool or workpiece to be clamped and then being mechanically supported by the axially separated components of the compensating unit, whereby the fluid pressure in the cylinder can be completely released whilst the clamping force is maintained.

The invention starts from the consideration that, especially with a purely hydraulic clamping device, clamping forces of any magnitude and sufficiently large movements, i.e. the largest possible axial movement of the clamping anchor, can be achieved, and also the considerable drawbacks which occur with a component subjected to pneumatic or oil pressure can be eliminated, if the compensating unit hitherto used only for taking up tolerance-dependent variations in the dimensions of components is used for a completely new purpose. This new purpose is, in combination with a fluid pressure-operated clamping cylinder, to mechanically support the cylinder and cylinder piston in the clamping position so that the fluid pressure in the cylinder can be reduced to zero without any loss of the clamping force applied.

Owing to the fluid pressure coupling of the clamping cylinder with the compensating unit, when the clamping anchor is axially pulled up, the upper component of the compensating unit is also axially adjusted in position by the same amount, so that after the clamping pressure in the cylinder has been released, the anchor is mechanically held by the compensating unit in the raised, clamping position, because the cylinder piston bears against the upper, separated component of the compensating unit and is held by this unit in the clamping position. The hydraulic or pneumatic fluid pressure control does not need to be secured against a sudden pressure drop, which may occur, for example, with unexpected leakages. In contrast to the known toggle lever systems, where the clamping force does not reach its maximum until the last instant on account of the geometry of the system, the workpiece or tool may be clamped at any time with maximum force by the device in accordance with the invention.

With advantage, the compensating unit component adjacent the cylinder may engage with a housing projection into a bottom recess of a housing of the cylinder. A stub of the cylinder piston also extends into this recess. When installed, the cylinder is thus fitted over the housing projection of the compensating unit with the end faces of this projection and of the piston stub bearing one against the other. The recess may have a depth equal to the axial stroke of the component of the compensating unit.

The clamping anchor may pass centrally through the compensating unit and may then advantageously be screwed into a screw-threaded bore of the piston stub.

An electrical signal emitter may act between the housing projection and the piston stub. This emitter is preferably mounted on the end face of the housing projection and the bearing of the housing projection against the end face of the piston stub is thus monitored. If the emitter does not generate any signal, it can be concluded that correct functioning of the combined clamping cylinder and compensating unit is not taking place, for example if the piston has travelled through a too large stroke owing to the anchor having fractured.

For additional monitoring, an electrical signal emitter which monitors the stop position of the cylinder piston may be provided on the inner face of a cylinder head or cover. The stroke of the cylinder piston preferably exceeds the axial movement of the compensating unit. In this way the result can be achieved that, if the compensating unit component has been raised into its limiting axial position but no clamping force has built up and consequently the housing projection has not come into bearing against the piston stub, the component of the compensating unit is again retracted into its basic position. This retraction may be triggered, when the piston face of the cylinder piston remote from the piston stub contacts the inner face of the cylinder head, by the signal emitter which is mounted on the inner face of the head. In the basic position, the compensating unit actuates a limit switch, which indicates to an operator that no clamping force is present.

The clamping force of the clamping anchor can advantageously be monitored or controlled during operation, by a pressure-limiting valve disposed in a fluid pressure line which leads to the release side of the piston which operates the compensating unit. The temporarily established monitoring pressure is, in this case, controlled by the valve to a fraction of the clamping pressure, so that it can be ascertained whether a clamping force is present without having any substantial effect upon the anchor, that is without releasing the workpiece or tool which is being clamped.

Preferably, the pressure in the cylinder upon releasing of the anchor is greater than the pressure during clamping. When this is so, the piston can be more simply lifted from the end face of the housing projection of the compensating unit and the hydraulic fluid of the compensating unit can more readily flow back during declamping.

The compensating unit may comprise an actuating element, which lowers the upper component automatically into the starting position, for example when no clamping force has been built up and the signal emitter of the component does not contact the piston stub of the clamping cylinder nor trigger any consequential functions.

In one embodiment of the invention, provision is made for a threaded nut which forms one component of the compensating unit to be screwed onto an immovable threaded sleeve and for an external gear ring on the nut to mesh with a pinion of a drive. Then, depending upon the rotation direction of the pinion meshing with the external gear ring, the threaded nut moves upwards or downwards into the desired position to lock the piston of the clamping cylinder in position. This happens because the threaded sleeve is fixed, preferably being secured on a baseplate of the combined clamping cylinder-compensating unit.

According to another embodiment of the invention, a rotatably journalled screw-threaded sleeve, which is screwed onto a threaded nut of the compensating unit which is secured against rotation, has a gear ring meshing with a pinion of an adjustment drive. In this case, the threaded sleeve is rotated by the pinion engaging with the gear ring. The gear ring is advantageously disposed beneath the threaded sleeve, because the rotational movement of the sleeve is converted into an axial, linear adjustment, i.e. raising and lowering movement of the unit, because the threaded nut is secured against rotation, preferably by a wedge or key.

A feature common to both these embodiments is that the axial adjustment movement of the component of the compensating unit is not dependent upon the limiting positions of a toothed rack, which could not be of unlimited length owing to constructional restrictions, but can be increased according to the number of turns made by the pinion, which can be unlimited.

The thread of the threaded sleeve is preferably self-locking and thereby assures holding of the threaded nut in the position in which it is set by the drive pinion.

The meshing engagement of the drive pinion with the external gear ring of the threaded nut or gear ring of the threaded sleeve can be obtained by the pinion projecting through an aperture in the wall of the housing of the clamping cylinder-compensating unit. If the clamping cylinder housing is so constructed that it surrounds the threaded nut and sleeve and extends as far as a base plate of the clamping cylinder-compensating unit, so that the clamping cylinder bears via its housing directly on the baseplate, the wall aperture, which may for example be shaped as a window or slit, is situated in the cylinder housing. If, alternatively, the threaded nut and sleeve are enclosed by a separate nut housing with the clamping cylinder housing being supported via the nut housing from the baseplate, then the opening will be situated in the nut housing. The support of the clamping cylinder, either indirectly or directly, via its housing from the baseplate, ensures that there is a screw connection which is not loaded by the hydraulic fluid, so that the threaded nut can be freely moved on the threaded sleeve.

The adjustment drive, which is preferably motor-driven for example by an electric, pneumatic or hydraulic motor, is preferably flange-connected to a housing wall of the clamping cylinder-compensating unit. This provides a compact device requiring little space for fitting or mounting.

The drive shaft of the adjustment drive may preferably be parallel to the longitudinal axis of the clamping anchor, i.e. the drive is flange-connected axially on the housing of the clamping cylinder-compensating unit, giving a direct tooth engagement of the pinion into the gear ring of the threaded sleeve or nut; intermediate gear wheels can then be omitted.

BRIEF DESCRIPTION OF THE DRAWINGS

Some examples of devices in accordance with the invention will now be described with reference to the accompanying drawings in which.

DESCRIPTION OF THE PREFERRED EMBODIMENTS

Figure 1:
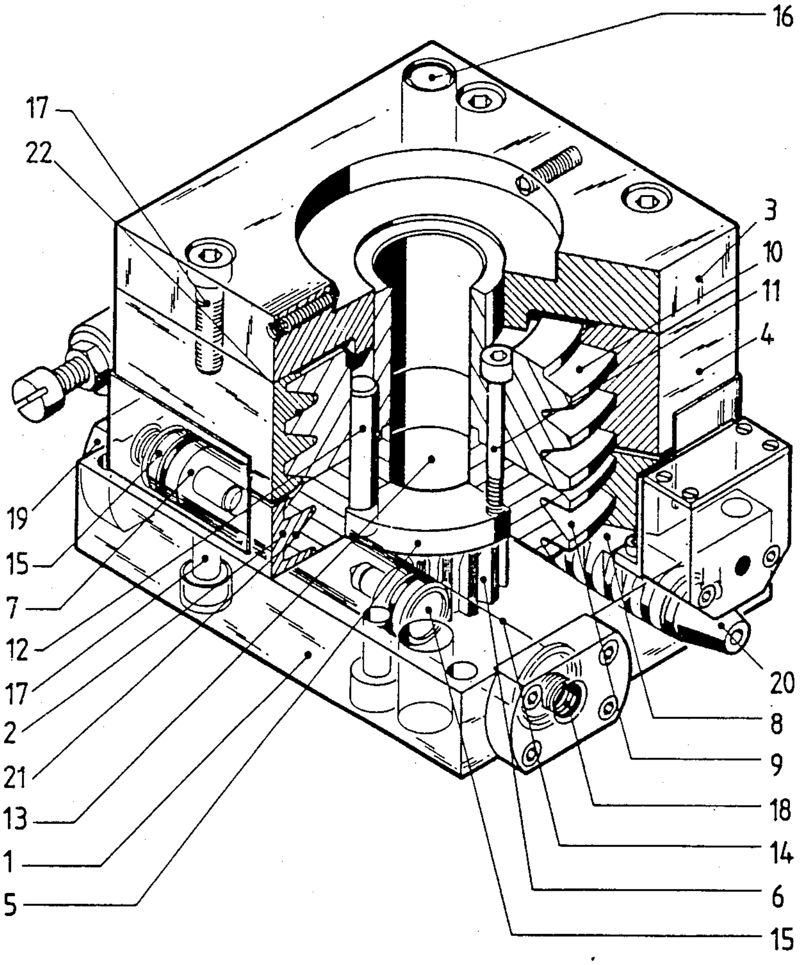
FIG. 1 is a perspective view of a prior art compensating unit shown partly in section.

The known compensating unit, illustrated in FIG. 1, comprises a rectangular lower housing part 1 and a lower screw-threaded component 2, fixed thereto. Above this, an upper screw-threaded component 4 is disposed and is firmly fixed to an upper housing part 3. In the lower housing part 1, a pinion 5 having an external gear ring 6 is rotatably journalled and is in engagement with a toothed rack 7 and a toothed rack 8 parallel thereto. The pinion 5 and a lower screw-threaded bolt 9 and an upper screw-threaded bolt 10 are secured to one another, in rotation and displacement, by two dowels 12 and three cylinder-headed bolts 11. A central bore 13 passes through the pinion 5 and the lower and upper threaded bolts 9, 10. The lower threaded bolt is equipped with a righthand thread 21, which cooperates with a corresponding internal thread in the lower threaded component 2, whereas the upper threaded bolt 10 engages with a lefthand thread 22 into an internal thread of the upper threaded component 4. The threads can be formed as sawtooth or abutment threads, the pitch of which in the threaded bolt 9 is only half that in the upper threaded bolt 10. When the pinion 5 is rotated, the lower threaded bolt 9 then displaces relative to the lower threaded component 2 by only one half the distance of the displacement of the upper threaded component 4 with the upper housing part 3 in relation to the upper threaded bolt 10.

The toothed rack 7 is disposed in a housing bore 14 and possesses, at each end, hydraulic pistons 15, which are sealingly guided in the housing bore. Each side of the toothed rack 7 is supplied, via a hydraulic connection 18, 19, with hydraulic fluid in order to displace the rack into the one or other limiting position and to screw in or out the threaded bolts 9, 10 in the threaded components 2, 4. The toothed rack 8, which is parallel to the toothed rack 7, cooperates with a movement-dependent switching device 20, which is constructed as an adjustable limit switch and serves for controlling the limiting position indication or pressure loading of the hydraulic pistons 15.

During rotation of the threaded bolts 9, 10 and the corresponding axial displacment of the threaded bolts and of the housing part 3 of the threaded component 4, these parts are axially guided relative to one another and secured against rotation by guide bolts 16. The housing lower part 1 is firmly fixed to the lower threaded component 2 and the housing upper part 3 to the upper threaded component 4 by means of bolts 17.

Figure 2:
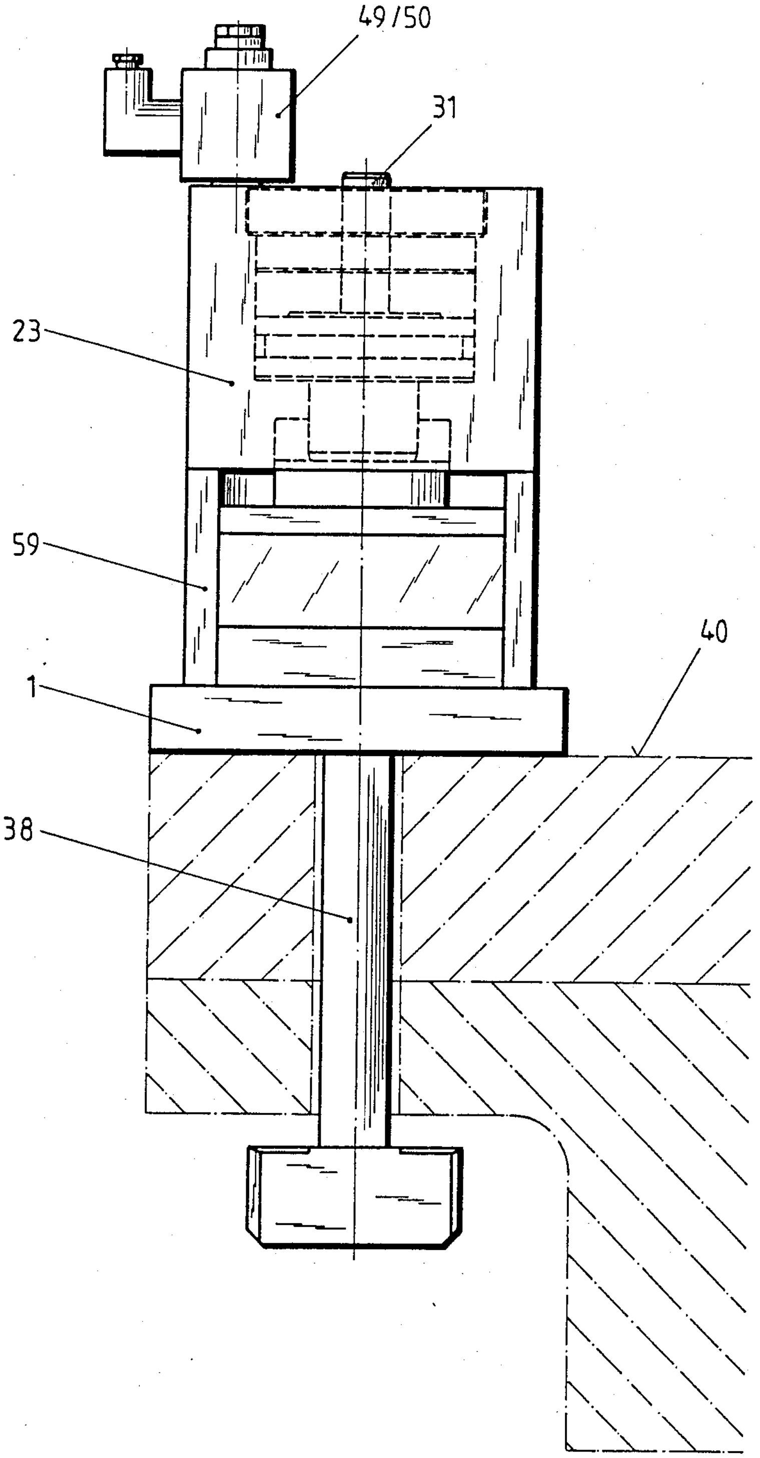
FIG. 2 is a side view of a clamping cylinder combined with a compensating unit to form the first example of a device in accordance with the invention and showing the tensile anchor of the device lowered.
Figure 3:
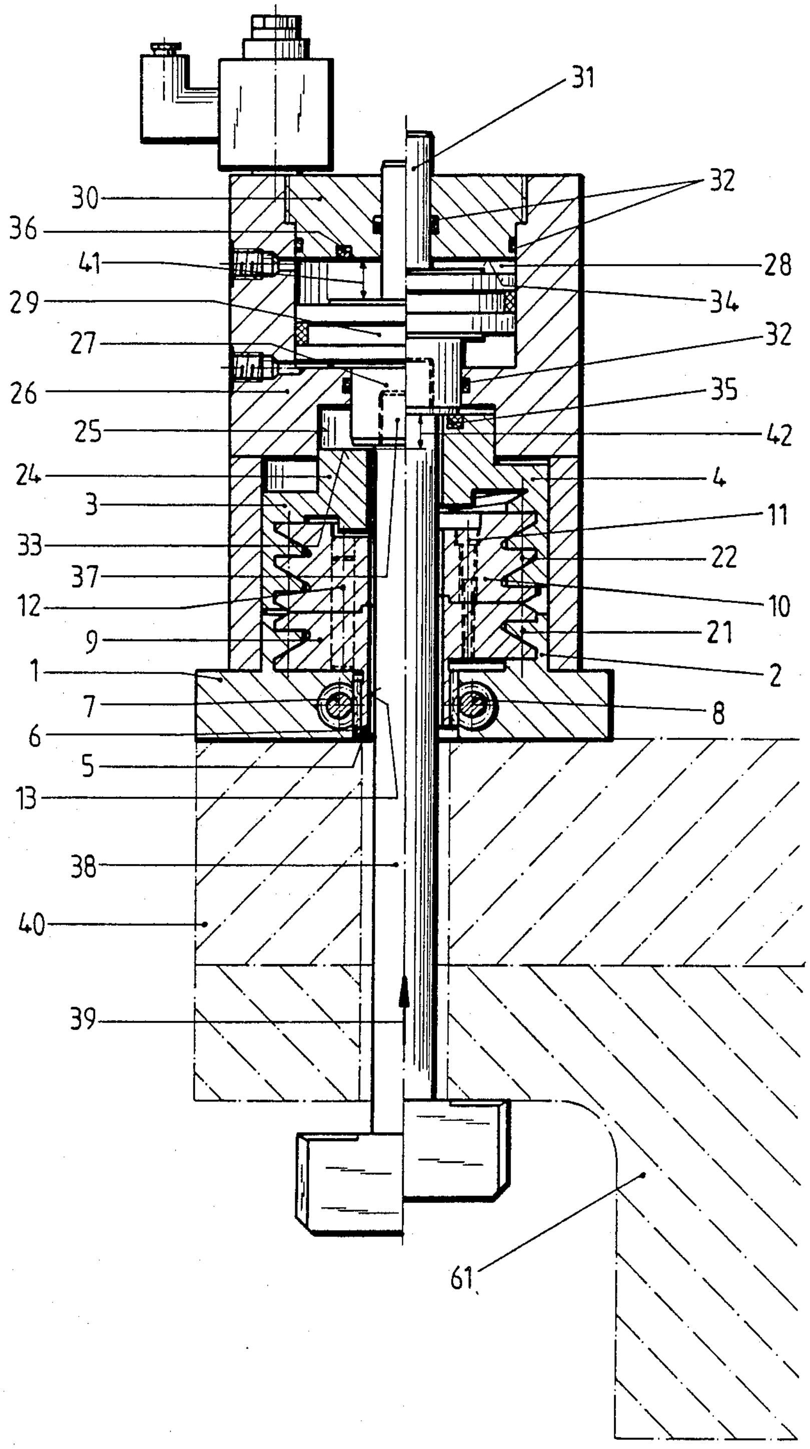
FIG. 3 is a longitudinal section through the device shown in FIG. 2 with the device shown in two different operating positions on opposite sides of a centre-line.

As compared with the known compensating unit just described, the compensating unit shown in FIGS. 2 and 3 in combination with a hydraulic cylinder 23 differs firstly by an external housing 59, which bears via the lower housing part 1 on a machine table 40 and in turn provides a support for a clamping cylinder 23 (FIG. 2). Secondly, the adjustable upper housing part 3, 4 of the compensating unit, which is enclosed by the outer housing 59, has a housing projection 24. This engages into a recess 25 of the cylinder housing 26, i.e. the cylinder housing 26 encloses the projection 24 of the compensating unit. A piston stub 27 of a piston 29, which is movable in a cylinder chamber 28 of the cylinder 23 also penetrates into the recess 25. A cover or cylinder head 30, set from above into the cylinder housing 26, closes the cylinder chamber 28 from the outside. A piston rod 31 of the piston 29 projects outwards through the cylinder head 30 and seals 32 prevent the escape of hydraulic fluid from the cylinder chamber 28 (FIG. 3).

Schematically illustrated signal emitters 35, 36 are disposed both in the region of an end face 33 of the housing projection 24 of the compensating unit and also on the end face 34 of the cylinder head 30, facing towards the cylinder chamber 28. The signal emitter 35 monitors the bearing of the end face of the housing projection 24 against the piston stub 27, while the signal emitter 36 indicates the limiting position of the piston 29 when contact of the piston 29 with the end face 34 of the cylinder head 30 occurs. In this position, the limit switch 36 may also trigger a sequential function, for example the resetting of the compensating unit into its starting position, illustrated in the lefthand half of FIG. 3, because, for example, when the piston 29 meets the cylinder head 30, a tensile anchor 38, which is screwed into a threaded bore 37 of the piston stub 27, has been raised in the direction of an arrow 39, without clamping a workpiece or tool 61.

When the tensile anchor 38 is tightened in the clamping force direction of the arrow 39, the upper housing parts 3, 4 of the compensating unit are equally correspondingly axially adjusted, i.e. the housing projection 24 engages correspondingly further into the recess 25 (the clamped position is illustrated in the righthand half of FIG. 3). As soon as the tensile anchor 38 is situated in its clamping position, the signal emitter 35 indicates contact, i.e. the bearing position of the projection 24 against piston stub 27, whereupon the fluid clamping pressure existing in the cylinder chamber 28 can be completely released, because the piston 29 bears mechanically via the piston projection 27 against the housing projection 24 of the upper housing part 3 and is thus mechanically locked in position. The clamping cylinder 23 bears, with its housing 25, 59 upon the compensating unit and the latter, in turn, bears via the housing lower part 1 upon a rigid base, for example a machine table 40. The stroke 41 of the piston 29 is slightly greater than the axial stroke 42 of the upper housing parts 3, 4, so that the piston 29, if no clamping force is applied, for example if the tensile anchor fractures, does not come into contact with the signal emitter 35 of the raised upper housing parts 3,4 of the compensating unit. In this case, the upper housing part is automatically lowered into its starting position. For this purpose, an actuating element, for example a spring 60, acts upon the toothed rack 8 of the compensating unit (FIG. 4) or from the release side upon the toothed rack 7.

Referring to the hydraulic circuit diagram of FIG. 4 for a clamping cylinder-compensating unit operated with oil as the working fluid, the sequence of the hydraulic control during clamping and releasing of the tensile anchor and for monitoring the clamping force during clamping will now be described in detail.

When a switch on an external control panel, not shown, is actuated, a pump 46, which is driven by a motor 45, supplies liquid under pressure from a tank 44, which is monitored by an oil level indicator 43, via multi-way magnetic valves 47, 48, which are switched from the actuating side b, and a non-return valve 51, to the piston side I of the hydraulic cylinder 23. Owing to the oil supply via the valve 48, a pressure of 180 bar builds up in the system, so that the piston 29 and thus also the tensile anchor 38 are moved until the anchor 38 is in its clamping position. As soon as the clamping pressure in the cylinder 23, which is monitoed by pressure limiting valves 52, 53, has reached 180 bar (providing approximately 100 kN clamping force), the valves 49, 50 are electrically switched, the valve 50 closing and maintaining the pressure acting on the piston 29. The oil now flows to the piston side 15*a* of the piston 15 which actuates the toothed rack 7 and, via the pinion 5, adjusts the housing upper part 3, 4 of the compensating unit until its projection 24 bears against the piston stub 27. The bearing position is monitored by the limit switch 35 (FIG. 3, right half), which also triggers the function that the motor 45 and therefore the pump 46, and also the valves 47, 48, 49 and 50 are switched to the no-flow position. The clamping pressure in the cylinder chamber 28 of the clamping cylinder 23 can now decrease to zero, i.e. the hydraulic oil flows into a tank 44. The piston 29 now bears, via its piston stub 27, against the projection 24 of the upper housing part 3 of the compensating unit.

Figure 4:
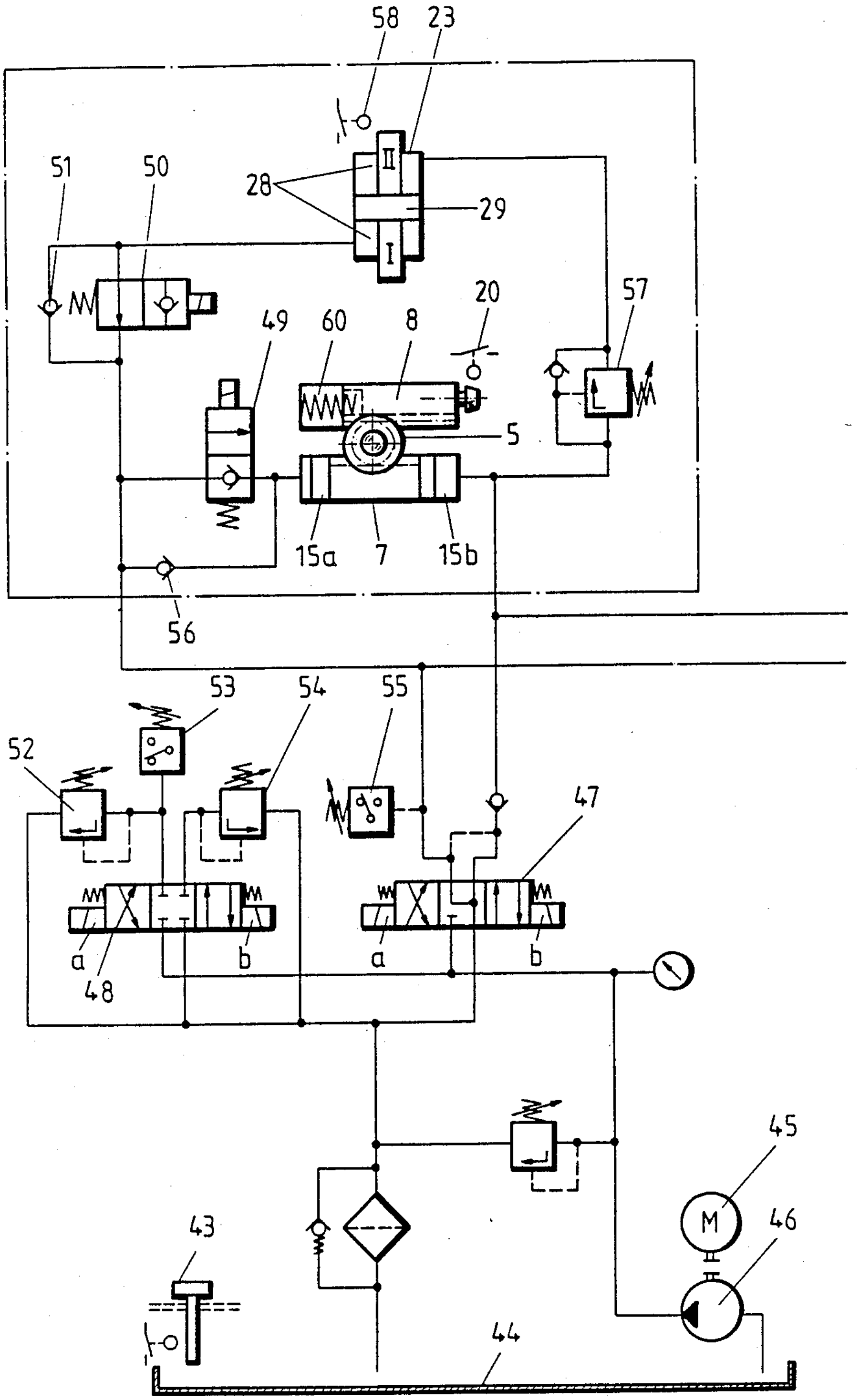
FIG. 4 is a hydraulic circuit diagram for the device shown in FIGS. 2 and 3.

For the clamping force to be monitored during clamping, the pump 46 and the multi-way magnetic valves 47, 48 are temporarily switched, i.e. they are energised on their adjustment side referenced a, so that they move to the right, differing from the position shown in FIG. 4. The pump 46 then supplies oil via the valve 47 to the release side 15*b* of the rack 7 of the locked compensating unit. The monitoring pressure is limited to 30 to 40 bar by a pressure-limiting valve 54, connected in the switching position 48*a* with the valve 48. Within two to three seconds, the clamping force can be monitored in a controlled manner via a timing relay, without a clamped workpiece or tool 61 (FIG. 3) being loosened by this temporary monitoring pressure or the bearing of the clamping cylinder and compensating unit on the machine table 40 being cancelled.

For releasing the tensile anchor 38, the pump 46 is switched on and the valve 50 is switched from its position shown in FIG. 4 towards the left and the multi-way magnetic valve 47 is actuated from its side b. The pump can then supply oil via the valves 47 and 51 to the lower face of the piston (referenced I in FIG. 4) of the cylinder piston 29, until a pressure of 250 bar is reached. This limiting pressure is controlled by a pressure switch 55. The valve 50 shuts off the pressure of 250 bar and the valve 47 is switched into the opposite switching position. By the changing-over of the valve 47, the oil now passes to the piston side 15*b* of the piston 15 which actuates the toothed rack 7 so that the rack is moved into its starting position and the pinion 5 is thereby rotated, so that the upper housing part 3, 4 of the compensating unit moves away from the piston stub 27 and descends into its starting position shown at the lefthand side of FIG. 3. The other toothed rack 8, which engages with the pinion 5 and is parallel to the toothed rack 7, likewise adjusts itself and, on contact with the limit switch 20, indicates that the starting position of the compensating unit has been reached. In the starting position, the valves 47, 50 are switched out of circuit. The clamping pressure in the cylinder 23 can thereby decrease and the oil flows back into the tank 44. The piston 29 of the clamping cylinder can then be reset, for example by means of a restoring spring, not shown, into the starting position, in which the clamping force is cancelled and the tensile anchor 38 is released from the tool 61 (FIG. 3, lefthand half). If the clamping cylinder is double-acting, when a pressure of 200 bar, for example, is reached, as soon as the toothed rack 8 reaches the limit switch 20 of the compensating unit and thereby indicates that the upper housing part 3, 4 has reached its lowered starting position, the oil is supplied via a pressure-limiting valve 57 to the piston side II of the clamping cylinder piston 29 and the clamping force is released, i.e. the tensile anchor 38 is lowered. After the release position has been reached, a limit switch 58 switches the pump 46 and valve 47 out of circuit.

Figure 5:
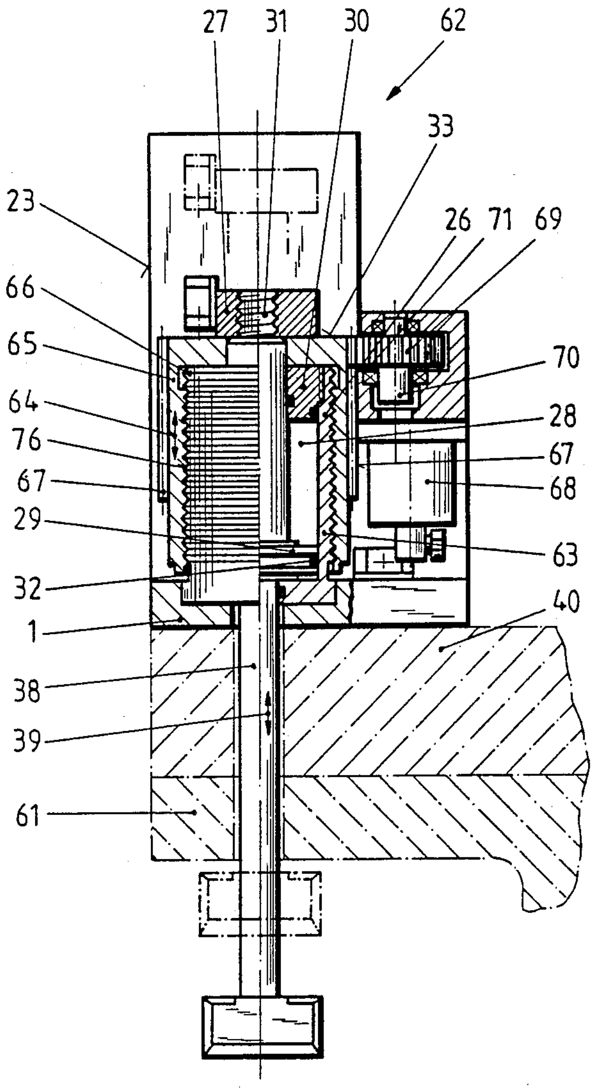
FIG. 5 is a view similar to FIG. 2, but of a second example having an adjustment drive meshing with an external gear ring of a threaded nut; and, FIG. 6 is a view similar to FIG. 2, but of a third example having an adjustment drive meshing with a gear ring of a threaded sleeve.
Figure 6:
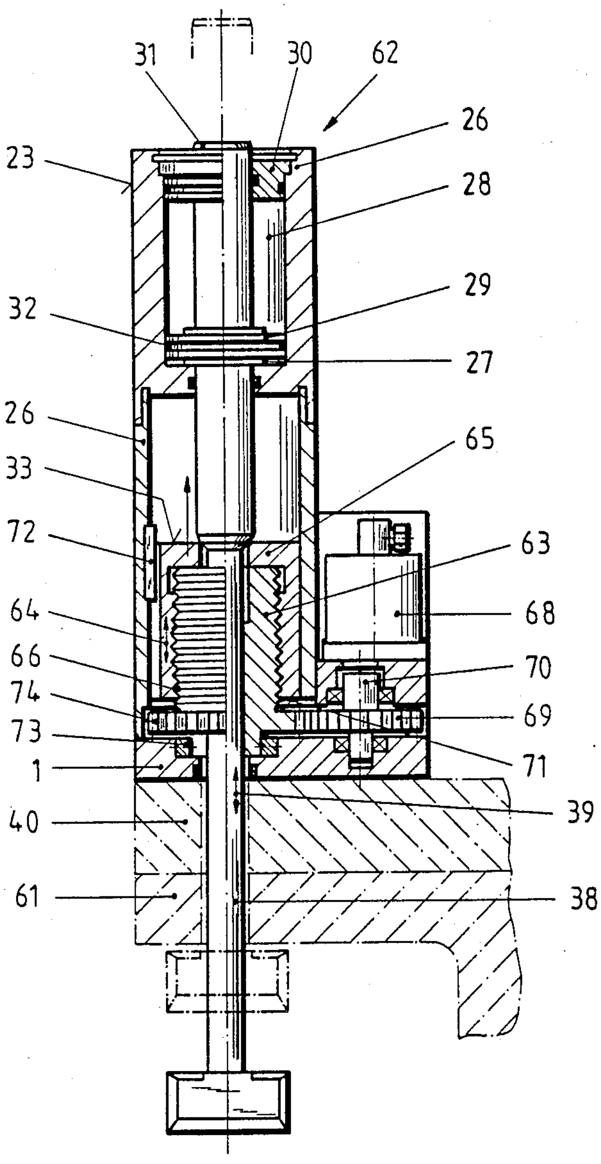

The examples of clamping cylinder-compensating units 62 for fixing a tool or workpiece 61 to, or releasing the tool or workpiece 61 from a machine table 40 of a machine tool (not illustrated) by means of a tensile anchor 38, which can be raised or lowered in the direction of arrow 39, as shown in FIGS. 5 and 6 comprise the clamping cylinder 23 and a compensating unit combined therewith. The compensating unit has a threaded nut 65 which can be axially adjusted relative to a threaded sleeve 63 in the direction of an arrow 64. The tensile anchor 38 is either raised or lowered in the direction of the arrow 39, depending upon the pressurising of a pressure chamber 28 of the clamping cylinder 23 on either the release or the clamping side of a clamping piston 29. The cylinder housing 26 of the clamping cylinder 23 rests upon a baseplate or a lower housing part 1 of the clamping cylinder-compensating unit and surrounds the threaded nut 65 and the threaded sleeve 63. A cylinder head 30, which is recessed from above into the cylinder housing 26, closes the cylinder chamber to the outside. A piston rod 31 of the piston 29, which has seals 32, projects out through the cylinder head 30.

In the example of the clamping cylinder-compensating unit 62 shown in FIG. 5, the threaed sleeve 63, which has a self-locking external thread 76, is firmly fixed immovably to the baseplate 1. The nut 65, which is screwed with a suitable internal thread onto the external thread 66 of the sleeve 63, has an external gear ring 67 with teeth extending virtually over the entire length of the nut. An adjustment drive 68 is connected by a flange to the cylinder housing 26 with the longitudinal axis of a drive shaft 70, carrying a pinion 69, parallel to the longitudinal axis of the tensile anchor 38. The pinion 69 penetrates through a slit-like wall aperture 71 into the interior of the clamping cylinder 23 and meshes with the external gear ring 67 of the threaded nut 65. If the pinion 69, when in its starting position, in which the nut is situated in its lowest position, engages at the upper end into the external gear ring 67 of the nut 65, an adjustment stroke of the threaded nut 65 corresponding to the entire length of the external gear ring is obtained.

After the piston 29 has raised the tensile anchor 38 sufficiently far for the tool or workpiece 61 to be clamped to the machine table 40, the nut 65 is screwed upwards by the pinion 69 on the thread 66 of the threaded sleeve 63 until the end face 33 of the nut 65 comes into bearing against a piston stub 27 of the piston 29, projecting out from the cylinder chamber 28. This locks the piston 29 in position. The feed of pressurised fluid can then be interrupted and the pressure in the cylinder chamber 28 falls to zero, because the threaded nut 65 mechanically supports the piston 29 via the end face 33. The stop position or surface contact is monitored by limit switches, not shown.

The clamping cylinder-compensating unit 62 shown in FIG. 6 differs from the device of FIG. 5 in that the threaded nut 65 is secured against rotation by a wedge or key 72. Instead, the threaded sleeve 63 is rotatably journalled in a bearing 73 of the baseplate 1. The threaded sleeve 63 has a ring gear 74, disposed in its lower region, i.e. in the immediate vicinity of the baseplate 1. This ring gear meshes with the pinion 69 of the adjustment drive 68 which penetrates through the wall aperature 71. The thread 66 of the sleeve 63 ends just above the gear ring 74, so that the threaded nut 65, when screwed completely onto the sleeve 63 in its starting position, also ends above the gear ring 74. The rotational locking of the nut 65 by the wedge or key 72 has the effect that, when the pinion 69 is rotated, the rotational movement of the threaded sleeve 63 is converted into an axial linear movement of the threaded nut 65. The adjustment movement of the threaded nut 65 corresponds, in this case, to the length of the threaded portion of the threaded sleeve 63. Here again, the threaded nut 65 is adjusted sufficiently far for it to bear with its end face 33 against the end face 27 of the piston stub 27 of the cylinder piston 29 and thus to provide mechanical support of the piston 29; limit switches monitor the surface contact.

Instead of the examples described, the compensating unit may also be combined, for example, with a pivoting device for the tensile anchor or with a rotary device or with a rotation-linear movement device.

We claim:

1. A clamping device for clamping an object in position, said device comprising a clamping anchor, a clamping cylinder, means operatively connecting said clamping cylinder to said clamping anchor, fluid pressure means for operating said clamping cylinder, said clamping cylinder being operated exclusively by said fluid pressure means, and a compensating unit, said compensating unit comprising at least two components, mechanical means for separating said components axially one from the other, a fluid pressure device for operating said mechanical means and means connecting said fluid device to said fluid pressure means which operates said cylinder, said compensating unit further comprising an external housing part and said cylinder further comprising a cylinder housing, said external housing part supporting said cylinder housing and said cylinder, when in a clamping position by one of said components of said compensating unit whereby fluid pressure in said cylinder can be completely released but said clamping force of said anchor against said object is maintained.

2. A device as claimed in claim 1, in which one of said components of said compensating unit adjacent said cylinder includes a housing projection, said cylinder housing includes means defining a bottom recess and said cylinder further comprises a piston including a stub, said stub and said housing projection extending into engagement with each other in said recess to provide said retaining of said cylinder.

3. A device as claimed in claim 2, in which said means connecting said anchor to said cylinder includes a tensile member extending centrally through said compensating unit, said tensile member being screwed into a screw-threaded bore in said stub.

4. A device as claimed in claim 2, further comprising electric signal emitter means acting between said housing projection and said stub.

5. A device as claimed in claim 2, in which said cylinder includes a head and further comprising electric signal emitter means monitoring the abutment of said piston against said cylinder head.

6. A device as claimed in claim 2, in which the stroke of said piston exceeds said axial separation of said components of said compensating unit.

7. A device as claimed in claim 1, in which said fluid pressure means includes a fluid pressure line conducting pressurised fluid to a release side of said compensating unit and a pressuring limiting valve in said line, said pressure limiting valve controlling the force applied by said cylinder to said anchor.

8. A device as claimed in claim 1, in which said fluid pressure means includes means for generating a fluid pressure in said cylinder which is greater during releasing of said anchor than it is during the application of said clamping force from said cylinder to said anchor.

9. A device as claimed in claim 1, further comprising actuating means for moving said components of said compensating unit axially towards each other after said components have been separated one from another.

10. A device as claimed in claim 1, in which said mechanical means of said compensating unit includes rotating, pivoting, or lifting and rotating means coupled with said compensating unit and said clamping cylinder.

11. A device as claimed in claim 1, in which one of said components of said compensating unit is a screw-threaded nut and another of said components is an immovable screw-threaded sleeve, said nut being screwed onto said sleeve, a toothed ring mounted on said nut and drive means including a pinion meshing with said toothed ring, whereby said drive means rotates said nut to move said nut on said sleeve.

12. A device as claimed in claim 1, in which one of said components of said compensating unit is a screw-threaded sleeve, means rotatably mounting said sleeve, a nut, means mouting said nut in said unit and securing said nut against rotation thereof, said sleeve being screwed onto said nut, a toothed ring mounted on said sleeve, drive means including a pinion, said pinion meshing with said toothed ring whereby operation of said drive means rotates said sleeve to move said sleeve relative to said nut.

13. A device as claimed in claim 11 or claim 12, including self-locking screw-threads on said sleeve and said nut.

14. A device as claimed in claim 11, further comprising a baseplate, means mounting said cylinder and said compensating unit on said baseplate and means fixing said sleeve to said baseplate.

15. A device as claimed in claim 12, in which said means securing said nut against rotation is a wedge or key.

16. A device as claimed in claim 12, in which said toothed ring is mounted on said sleeve on the side of said nut remote from said cylinder.

17. A device as claimed in claim 11, further comprising a housing surrounding said cylinder, said sleeve and said nut, said housing including a wall and means defining an aperture in said wall, said pinion extending from outside said wall through said aperture intomeshed with said toothed ring.

18. A device as claimed in claim 11, further comprising a housing including a wall surrounding said cylinder, said sleeve and said nut and flange means fixing said drive means to said wall.

19. A device as claimed in claim 11, in which said means operatively connecting said cylinder to said anchor includes a tensile member extending centrally through said compensating unit and said drive means includes a drive shaft extending parallel to said tensile member.

20. A device as claimed in claim 11, in which said drive means includes a motor.

* * * * *

UNITED STATES PATENT AND TRADEMARK OFFICE

CERTIFICATE OF CORRECTION

PATENT NO. : 4,697,800

DATED : Octcber 6, 1987

INVENTOR(S) : Bernhard Stahl et al

It is certified that error appears in the above-identified patent and that said Letters Patent is hereby corrected as shown below:

On the Title Page:

In the heading of the Patent, it should read:

[75] Inventors: Bernhard Stahl

Signed and Sealed this

Twenty-second Day of March, 1988

*Attest:*

DONALD J. QUIGG

*Attesting Officer*

*Commissioner of Patents and Trademarks*